United States Patent [11] 3,607,194

| [72] | Inventor | Daniel R. Ayers |
| | | Shelburne, Vt. |
| [21] | Appl. No. | 29,188 |
| [22] | Filed | Apr. 20, 1970 |
| [45] | Patented | Sept. 21, 1971 |
| [73] | Assignee | Corning Glass Works |
| | | Corning, N.Y. |

[54] PRESSURE CONTROL SYSTEM FOR GLASSWARE PRESS MOLDING
6 Claims, 3 Drawing Figs.

| [52] | U.S. Cl. | 65/160, 65/275, 65/318 |
| [51] | Int. Cl. | C03b 11/16 |
| [50] | Field of Search | 65/160, 161, 275, 318 |

[56] References Cited
UNITED STATES PATENTS

| 1,130,918 | 3/1915 | Miller | 65/160 X |
| 3,180,718 | 4/1965 | Wilhelm | 65/160 X |
| 3,268,319 | 8/1966 | Kawecka et al. | 65/160 |
| 3,337,325 | 8/1967 | Bittner et al. | 65/318 X |
| 3,471,281 | 10/1969 | Bittner et al. | 65/160 X |

Primary Examiner—Arthur D. Kellogg
Attorneys—Clarence R. Patty, Jr. and Charles W. Gregg ABSTRACT: A system for controlling the pressing forces exerted by complemental mold members against a charge of molten thermoplastic material during a press forming stage of a cycle of press forming of the charge into an article having desired dimensions and shape. Means are employed for providing a first varying signal or sequence of signals representative of a program for said pressing forces, a second varying signal or sequence of signals representative of the actual pressing forces exerted during said press forming stage, and comparing said signals to produce third signals representative of any differences in the first and second signals or sequences thereof. The third signals control the pressing forces by selective adjustment of pressurized fluid supplied for actuation of at least one of the mold members toward the other during the press forming stage of the cycle of press forming the charge of molten material.

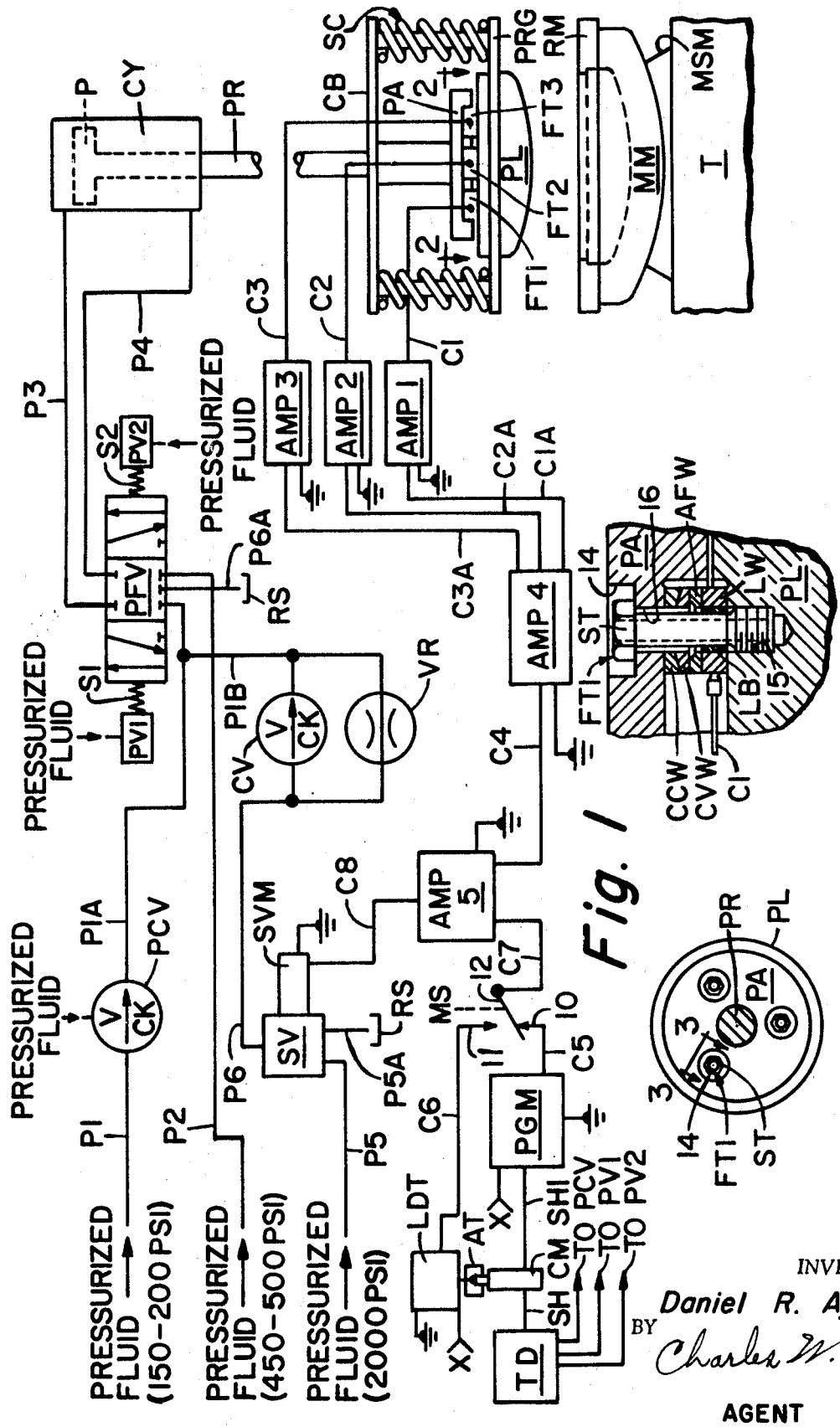

PRESSURE CONTROL SYSTEM FOR GLASSWARE PRESS MOLDING

BACKGROUND OF THE INVENTION

In the press forming of a mold charge of a molten thermoplastic material, such as a mold charge of a molten glass making material for example, to produce a final product or press formed article it has long been known that the actual pressing forces exerted against such a charge during the actual press forming stage of a press forming cycle is important in order that said final product or article has as optimum characteristics as possible. For example, as is well known in the glassmaking art, the employment of too high of pressing forces during said press forming stage may cause so-called "fins" or "checks" in the final article while too low of pressing forces during said stage may result in so-called "unfills." Furthermore, too high of pressing speeds during said stage may cause so-called "tears," "impact marks" or "air traps" in said article while too low of pressing velocities during the pressing stage may create so-called "chill marks" in the final product or article.

In the press forming of a product or article having a relatively complex configuration, the margin between too high or too low of pressing forces and/or velocities during the actual pressing stage of a press-forming cycle may be relatively narrow and, therefore, it is highly desirable to optimumly control said forces and velocities during said actual pressing stage. Previous to the development of the control system herein disclosed it has not been possible to provide the desired optimum control of said pressing forces and/or velocities except by manual adjustments which depend on the skill of workmen or operators assigned to the task of making said adjustments. Accordingly, it is an object of the present invention to provide an automatic system for controlling said pressing forces and velocities in accordance with programs thereof each of which is carefully selected in accordance with parameters relating to the forming characteristics of the molten material from which an article or product is to be formed and the shape and dimensions of the article or product formed.

SUMMARY OF THE INVENTION

In accomplishing the above object of the invention, there is provided means which provides a varying first signal or sequence of signals representative of pressing forces necessary to press form by cooperative pressurized fluid-actuated mold members a desired article or product in accordance with said parameters, means for producing a second varying signal or sequence of signals representative of actual pressing forces exerted in said forming of said article, and means for comparing or algebraically summing said first and second signals to produce third signals representative of any differences in the first and second varying signals or corresponding ones of said first and second sequences of signals. Means which are responsive to said third signals are also provided for controlling said pressing forces by selective adjustment of the supply of pressurized fluid providing the pressing forces exerted by said mold members during the actual press-forming stage of a press forming cycle of such members.

BRIEF DESCRIPTION OF THE DRAWINGS

The invention will best be understood with reference to the accompanying drawings in which:

FIG. 1 comprises a schematic diagram of a control system embodying the invention;

FIG. 2 is a view taken generally along line 2—2 of FIG. 1 and illustrating the arrangement of a group of force detecting devices which may be employed in the practice of the invention disclosed; and FIG. 3 is an enlarged view taken generally along line 3—3 of FIG. 2 and illustrating in detail the structure of one type of a force detecting device which may be used in practicing the invention.

Similar reference characters refer to similar parts in each of the Figures of the drawings.

PREFERRED EMBODIMENT OF THE INVENTION

Referring to the drawings in detail, there is shown in FIG. 1 a pair of complemental or cooperative press-forming male and female mold members comprising a pressing plunger PL overlying the forming cavity of a main mold MM including the usual ring mold RM. Mold MM is supported by a mold support member MSM on the top surface of a suitable platform or table T. Plunger PL is affixed in any convenient manner to the lower portion of a plunger adapter PA which is, in turn, secured to the lower end of a piston rod PR whose upper end is secured to a piston P embodied in an associated pressurized fluid cylinder CY. A spring cage SC of a conventional type and including the usual crossbar CB and pressure ring PRG is also provided and the lower end of plunger PL extends through the annular orifice of pressure ring PRG as illustrated in FIG. 1 of the drawings. The apparatus thus far described is a well-known arrangement of press-forming components and such arrangement will be readily recognized by those skilled in the art.

First ends of suitable pressurized fluid conduits or pipes P3 and P4 are connected to the upper and lower ends, respectively, of cylinder CY and the second ends of such conduits or pipes are connected to a pressurized fluid flow control valve PFV which includes pressurized fluid pilot valves PV1 and PV2 and respectively associated springs S1 and S2 for actuation of the pressurized fluid flow control valve PFV as discussed hereinafter in more detail. Valve PFV has a connection to one end of a pressurized fluid conduit or pipe P1A whose second end is connected through a pilot-operated check valve PCV, to be hereinafter discussed, and thence through a pressurized fluid conduit or pipe P1 to a source of pressurized fluid which is maintained at a pressure of 150 to 200 p.s.i., for example. Valve PFV is also connected to one end of a pressurized fluid conduit or pipe P2 whose second end is connected to a source of pressurized fluid at a pressure of 450 to 500 p.s.i., for example.

The actuation of valve PFV is controlled by the usual timing drum TD shown in the lower left-hand part of FIG. 1 and, in the usual or typical press-forming cycle, such timing drum controls a supply of low-pressure pressurized fluid to pilot valve PV1 to cause valve PFV to be actuated to supply pressurized fluid from conduit or pipe P1A to pipe P3 and thence to the upper end of cylinder CY to actuate piston P, piston rod PR, and plunger PL and its associated components in a downward direction. At the time of said actuation of valve PFV, pipe or conduit P4 is connected through such valve and a pipe P6A to a suitable fluid tank or reservoir RS. Following the completion of the press-forming stage of said press-forming cycle, timing drum TD causes termination of said supply of fluid to pilot valve PV1 and spring S1 reactuates such pilot valve to cause return of valve PFV to its normal condition shown in FIG. 1. At substantially the same time or shortly thereafter, timing drum TD controls a supply of low-pressure pressurized fluid to pilot valve PV2 to cause valve PFV to be actuated to supply pressurized fluid from conduit or pipe P2 to pipe P4 and thence to the lower end of cylinder CY to actuate piston P, piston rod PR, and plunger PL and its associated components in an upward direction and, thereby to their normal positions shown in the drawing. At the time of said actuation of valve PFV, conduit or pipe P3 is connected through the valve to the previously mentioned fluid sink or reservoir RS. Following the completion of the movement of the pressing apparatus to its normal position shown in the drawings, timing drum TD causes termination of the supply of fluid to pilot valve PV2 and spring S2 then reactuates such pilot valve to again cause return of valve PFV to its normal condition.

Pressurized fluid flow control valves such as PFV and its associated pilot valves, as well as the system of control thereof by a timing drum such as TD, are all well known and, therefore, from the foregoing brief description, the arrangement described will be readily recognized by those skilled in the art.

Referring further to FIG. 1, shaft SH of timing drum TD is connected to a rotatable cam CM and to the input shaft SH1 of a programmer PGM which will be discussed in more detail hereinafter. The outer periphery of cam CM bears against the spring biased actuator AT of a linear displacement transducer LDT and such actuator is, thereby, operated to different positions during rotation of cam CM by shaft SH of timing drum TD. Transducer LDT is connected to a first terminal X of a suitable source of electrical energizing current and to ground for a return path for such current, such source not being shown in the drawings for purposes of simplification thereof. The output of transducer LDT is a varying signal, or a sequence of signals, which represent a program of pressing forces necessary to press form an article during the actual pressing stage of an article press-forming cycle, and said signal or signals are supplied to a conductor or cable C6 which is connected to a first fixed contact 11 of a manually actuated switch MS to be hereinafter further discussed. Transducers such as LDT are well known and such transducer may, for example, be a Model 7DCDT-3000 Linear Displacement Transducer which is manufactured and sold by Hewlitt-Packard Company, Palo Alto, California. Transducer LDT and its function will also be further discussed hereinafter in an operational example of the invention.

The previously mentioned programmer PGM is connected to said terminal X of the previously mentioned source of electrical energizing current and to ground for a return path for such current. The output of programmer PGM provides a varying output signal or a sequence of signals similar to that provided by transducer LDT and such signal or signals are supplied to a conductor or cable C5 which is connected to another fixed contact 10 of previously mentioned switch MS. The manually actuable contact 12 of switch MS is connected over an electrical conductor or cable C7 to one input of an amplifier AMP5 to be point discussed, and the previously discussed varying signal or sequence of signals from transducer LDT or from programmer PGM are, thereby, supplied to said amplifier according to whether said contact 12 of switch MS is closed against fixed contact point 11 or 10, respectively, of said switch. Programmers such as PGM are well known and such Programmer may, for example, be an adjustable function generator such as a VERNISTAT® which is obtainable from the Electronic Products Division of Perkin-Elmer Corporation, Norwalk, Conn. Programmer PGM will also be further discussed hereinafter in an operational example of the invention.

A group of three so-called force transducers FT1, FT2, and FT3 are mounted between previously mentioned plunger adapter PA and plunger PL, such transducers being equally spaced from each other and from the center of plunger adapter PA as best illustrated in FIG. 2 The mounting arrangement for each said transducer will be readily understood from the mounting arrangement for transducer FT1 illustrated in FIG. 3, transducers FT2 and FT3 being mounted in a manner identical to that shown for transducer FT1.

Referring to FIG. 3, a so-called load washer or piesoelectric device LW is located in a suitable space provided in plunger adapter PA and an antifriction washer AFW is placed on the top surface of lead washer LW. A pair of mating or complementally spherically concave and convex washers CVW and CCW, respectively, are placed on the top surface of antifriction washer AFW. A hollow bolt or stud ST of a flexible but strong material and having a threaded lower end extends through a hole 16 in plunger adapter PA, through the annular holes in washers AFW, CVW and CCW, through a locating bushing LB provided in the annular hole of washer LW. Said lower end of bolt or stud ST is screwed into cooperative threads provided in a suitable hole 15 in plunger PL. The head of stud or bolt ST is disposed in a hole such as 14 provided in the upper face of plunger adapter PA, such hole having a substantially larger diameter than the head of the stud ST.

It will be noted that the diameter of the body portion of stud or bolt ST is somewhat smaller than said hole 16 in adapter PA and said annular holes in washers CVW, CCW and AFW. However, stud ST extends relatively snugly through bushing LB which, in turn, fits relatively snugly in the annular hole in load washer LW. By such arrangement a limited amount of lateral movement of plunger PL in relation to adapter PA is permitted to allow for self-alignment of the plunger in the annular orifice of ring mold RM during pressing operations. It is also pointed out that washers CVW, CCW and AFW are of a thickness such that the lower face or surface of plunger adapter PA is normally somewhat separated from the upper face or surface of plunger PL (FIG. 3). The space provided between such faces or surfaces by such separation is, of course, to allow for compression forces to be supplied to the load washers such as LW of the force transducers such as FT1, FT2 and FT3 during the actual press-forming stage of a cycle of a press forming performed by mold members PL and MM. Force transducers such as FT1, FT2 and FT3 are well-known components and each such transducer may, for example, be of a type obtainable from Kistler Instrument Corporation, Clarence, New York. The force transducers will also be further discussed in the operational example of the invention to be set forth later.

The load washers of transducers FT1, FT2 and FT3 are each connected by conductors or cables C1, C2 and C3, respectively, to the inputs of suitable and respectively associated amplifiers AMP1, AMP2 and AMP3 each of which may, for example, be a Model 503M5A Universal Dial Gain Charge Amplifier which is obtainable from the aforementioned Kistler Instrument Corporation. The outputs of amplifiers AMP1, AMP2 and AMP3 are separately connected to input circuits of a summing and averaging amplifier AMP4 which produces a varying output signal or sequence of signals representative of the actual pressing forces employed or exerted against a charge of molten thermoplastic material by mold members PL and MM during the actual press-forming stage of a press-forming cycle of actuations of such mold members in the press forming of a desired article or product from said charge of molten material. That is to say, amplifier AMP4 produces a varying output signal, or a sequence of such signals, representative of pressing forces exerted by mold members PL and MM only during the period when both such members are contacting said charge of molten material and are press forming the same, that is, only during the period the force transducers such as FT1, FT2 and FT3 can detect press-forming forces exerted against said charge of molten material.

The output signal or signals from amplifier AMP4 are supplied over a conductor or cable C4 to another input of previously mentioned amplifier AMP5 which compares said varying signals supplied thereto from said cables C4 and C7, or corresponding ones of each said sequence of signals supplied to such amplifier from such cables, to thereby produce a varying output signal or a sequence of output signals representative of any differences in said varying signals or corresponding ones of said sequences of signals.

The output signal or signals from amplifier AMP5 are supplied over a conductor or cable C8 to the actuating motor SVM of a pressurized fluid flow control servo valve SV whose pressurized fluid input port is connected to a source of pressurized fluid having a pressure on the order of 2000 p.s.i., for example. Motor SVM is connected to ground to provide a return path for the difference signal or signals supplied thereto from amplifier AMP5. The pressurized fluid output port of valve SV is connected to one end of a suitable fluid conduit or pipe P6 whose second end is connected in multiple to input ports of a check valve CV and a variable fluid flow constriction VR both of which will be further discussed hereinafter. Valve SV is also connected through a conduit or pipe P5A to previously mentioned fluid sink or reservoir RS. The output ports of check Valve CV and restriction VR are connected over a fluid conduit or pipe P1B to previously mentioned pipe or conduit P1A and, thereby, to the previously mentioned valve PFV. Servo valves such as SV are also well known in the art and such valve may, for example, be an Electro-Hydraulic Servo Valve SD4-03-10-004-10 which is obtainable from Vickers, Incorporated, Troy, Michigan.

The apparatus arrangement of the invention having been described in detail, several brief operational examples of the invention will now be set forth.

It will first be assumed that a mold charge of molten thermoplastic material, such as a mold charge of molten glass for example, is supplied to the mold cavity of main mold MM and that timing drum TD initiates a cycle of operations for press forming said charge into a desired article by plunger PL and main mold MM. At such time timing drum TD controls a flow of low-pressure pressurized fluid to pilot valve PV1 of fluid valve PFV, as indicated by the arrow above such pilot valve in FIG. 1 of the drawings, and valve PFV is shifted in the right-hand direction (viewing FIG. 1) to connect pipe or conduit P1A to pipe or conduit P3 while, at the same time, connecting pipe or conduit P4 to pipe or conduit P6A and thence to reservoir or sink RS. The connecting of pipe P1A to pipe P3 as described above supplies pressurized fluid from the previously mentioned 150–200 p.s.i. source if such source of such fluid to the upper end of cylinder CY, and piston P, piston rod PR and, thereby, plunger PL are actuated in a downward direction to contact the charge of molten material in the mold cavity of main mold MM and initiate the actual press-forming stage of the aforementioned press-forming stage of the aforementioned press-forming cycle of operations.

It will be further assumed that manually actuated switch MS is, at the time of the above mentioned initiation of said actual press-forming stage in its position shown in FIG. 1 of the drawings, that is, with movable contact portion 12 of the switch closed against fixed contact point 10 thereof. At said time, or shortly thereafter, programmer PGM is actuated by shafts SH and SH1 from timing drum TD to supply a varying signal or sequence of signals to cable C5, such signal or signals being representative of a program of pressing forces selected in accordance with parameters relating to the forming characteristics of said mold charge of molten material and the shape and dimensions of the article to be finally formed from said charge. That is to say, said signal or signals are representative of a selected program of pressing forces which must be exerted against said charge of molten material, during at least a part of the actual press-forming stage of the forming cycle for such charge of material, in order to produce an article or product in accordance with said parameter. Persons skilled in the art can select an optimum program of or for said pressing forces with a very minimum amount of experimentation in the press forming of articles or products each having the desired parameters. Each such program would of course vary with different parameters for different articles or products to be formed as will be readily apparent to those skilled in the art.

The varying signal or sequence of signals supplied to cable C5 as discussed above are supplied from such cable to cable C7 and, thence as a first or one input to amplifier AMP5. Also during said actual press-forming stage of the aforementioned cycle of press-forming operations, transducers FT1, FT2 and FT3 are responsive to the actual forces being exerted by plunger PL against the charge of molten material in the mold cavity of main mold MM and such transducers supply varying signals or sequences of signals representative of said forces to cables C1, C2 and C3, respectively, from whence they are supplied as inputs to amplifiers AMP1, AMP2 and AMP3, respectively. Such amplifiers amplify said varying signals or sequences of signals supplied thereto from said transducers and supply the resulting signals over cables C1A, C2A and C3A, respectively, as separate inputs to summing and averaging amplifier AMP4. Amplifier AMP4 sums and averages the signals supplied thereto from cables C1A, C2A and C3A, and produces a varying output signal or sequences of signals which are representative of the actual pressing forces being exerted by plunger PL against the aforementioned charge of molten material during the actual press-forming stage of the cycle of press-forming operations employed in forming said charge. The output signal from AMP4 is supplied to a cable C4 from whence it is supplied as another or second input to AMP5.

The signals supplied to amplifier AMP5 are compared or algebraically summed by such amplifier which then produces a varying output signal or sequence of signals having a valve, and a direction or polarity, representative of any difference in said signals supplied as said first and second inputs to amplifier AMP5. The output signal from AMP5 is supplied to cable C8 and thence through the control windings of motor SVM of servo valve SV to ground. Motor SMV is, thereby, energized to be driven in first or second directions to control valve SV in corresponding directions and increase or decrease pressurized fluid flow therethrough as discussed below. Assuming, for example, that the signal supplied as said first input to AMP5 has a valve in excess of the signal supplied as said second input to such amplifier, motor SVM of valve SV will be driven and, in turn, will drive valve SV in said first direction. Under such conditions a pressurized fluid flow to pipe or conduit P6 and supplied to valve SV from the previously mentioned source thereof having a pressure on the order of 2000 p.s.i. will be increased and, thereby, such increased fluid flow will be supplied to conduits or pipes P1B and P1A. At such time any pressurized fluid flow through valve SV to pipe or conduit P5A, and thence to reservoir RS, will be correspondingly decreased. The increased fluid flow to conduit or pipe P1A from conduit or pipe P1B at such time will increase the fluid flow to pipe P3 and thence to the upper end of cylinder CY to cause actuation of plunger PL to increase pressing force supplied to the charge of molten material in the cavity of main mold MM. However, such increase in pressing force is proportional to the difference between said first and second input signals supplied to amplifier AMP5 at such time.

Assuming now, as a second example, that the signal supplied as said first input to AMP5 has a value less than the signal supplied as said second input to such amplifier, motor SVM of valve SV will be driven and, in turn, will drive valve SV in said second direction to decrease pressurized fluid flow to pipe or conduit P6 and to increase any pressurized flow through valve SV to pipe or conduit P5A and thence to reservoir RS. The decrease of pressurized fluid flow to pipe P6 will correspondingly decrease such flow to pipe P3 and, thereby, reduce the rate of increase of pressing force supplied to said charge of molten material, prevent any further such increase entirely, or reduce such pressing force. However, at such time, as with the previously discussed increase in pressing force, said reduction in the rate of increase in pressing force, the prevention of any further such increase, or a reduction in the pressing force is proportional to the difference between said first and second input signals supplied to amplifier AMP5.

Following the actual press-forming stage of the forming cycle, timing drum TD terminates the supply of low-pressure pressurized fluid to pilot valve PV1 and spring S1 returns valve PFV to its normal condition shown in FIG. 1 of the drawings to interrupt the supply of pressing pressure to cylinder CY. At substantially the same time or briefly thereafter, timing drum TD supplies low-pressure pressurized fluid to pilot valve PV2, as indicated by the arrow below such pilot valve, and valve PFV is, thereby actuated in its left-hand direction (viewing FIG. 1) to supply pressurized fluid from pipe or conduit P2 through valve PFV to pipe or conduit P4. At the same time conduit or pipe P3 is connected through valve PFV to conduit or pipe P6A and, thence, to reservoir RS. The pressurized fluid supplied to pipe P4 flows into the lower end of cylinder CY to actuate piston P, piston rod PR, and plunger PL and its associated apparatus in an upward direction to terminate the press-forming cycle. During such upward actuation of plunger PL, at the point in time when plunger PL is no longer exerting pressing forces on the article or product just formed in mold MM, transducers FT1, FT2, and FT3, no longer produce output signals representative of said pressing forces and the second signal supplied to amplifier AMP5 is, thereby, terminated. Therefore, at substantially the same period in time, timing drum TD actuates programmer PGM to terminate its output signal to amplifier AMP5 and such amplifier no longer supplies a difference signal to motor SVM for further actuation of servo valve SV. Following the completion of the upward movement of piston P, piston rod PR, an plunger PL, timing drum TD terminates the supply of low-pressure pressurized fluid to pilot valve PV2 and spring S2 returns valve PFV to its normal condition shown in FIG. 1 of the drawings. All of the apparatus or components shown in FIG. 1 are now in their normal conditions or positions in preparation for another press-forming cycle.

Referring now to cam CM attached to shaft SH from timing drum TD, the outer periphery of such cam has a configuration which is designed to produce a program of pressing forces corresponding to that of programmer PGM. Actuator AT of transducer LDT is spring biased against said outer periphery of cam CM and, therefore, as cam CM is rotated by shaft SH, said actuator AT is operated in accordance with said configuration of the outer periphery of cam CM to cause transducer LDT to produce a varying output signal or sequence of signals similar to that produced by programmer PGM, such signal or signals being supplied to cable C6. When therefore, switch MS is manually actuated so that the movable contact portion 12 of switch MS is closed against fixed contact 11 of such switch, transducer LDT supplies to amplifier AMP5 the varying signal or sequences of signals representative of the selected program of pressing forces to be exerted by the press forming apparatus during the actual press-forming stage of a cycle of press forming operations. Programmer PGM is not in use at such time since the connection between cables C5 and C7 is interrupted at fixed contact 10 of switch MS.

There are several advantages in arranging the apparatus of the invention to have a dual program arrangement employing, at times, a programmer such as PGM and, at other times, a cam such as CM and an associated transducer such as LDT. One such advantage, for example, is that the desired program may be set up or established by a manually adjustable programmer such as PGM and then a cam, such as CM, may be designed to actuate a transducer such as LDT in accordance with a program corresponding to that set up or established by use of the programmer. The desired program may then be controlled from the cam and transducer alone and no alterations in such program can be made by unskilled personnel attempting to adjust, or incorrectly adjusting programmer PGM. Another distinct advantage is that the program control may be arranged as described above and programmer PGM then transferred to another set of apparatus for setting up or establishing a different program of pressing forces for such other set of apparatus. This obviates the necessity of providing a relatively expensive component, such as a programmer PGM, for the programming of each set of apparatus which it is desired to control by a system embodying the invention herein disclosed.

The previously mentioned pilot-operated check valve PCV is also controlled from timing drum TD which at times causes a supply of low-pressure pressurized fluid to be supplied to such check valve. When no such pressurized fluid is supplied to check valve PCV, such valve operates as a normal check valve to prevent reverse flow from pipe P1A to pipe P1. However, there may be times during the actual press-forming stage of a press forming cycle that the program for such stage requires that the pressure in pipe P1A and supplied therefrom to the upper end of cylinder CY be below the 15-200 p.s.i. pressure supplied to pipe P1A from pipe P1. Accordingly, when the press forming operation is being controlled by programmer PGM or transducer LDT as previously discussed, timing drum TD supplies low-pressure pressurized fluid to check valve PCV, as indicated by the arrow above such check valve, to actuate such valve to prevent pressurized fluid flow from pipe P1 to pipe P1A and, thereby, place the value of the pressurized fluid supplied to the upper end of cylinder CY solely under the control of servo valve SV. Pilot operated check valves such as PCV are well known in the art and such valve may, for example, be an S18 Design of a C2-800 Series Check Valve which is obtainable from the aforementioned company, Vickers, Incorporated, Troy, Michigan.

Previously mentioned check valve CV is provided to normally prevent any reverse pressurized fluid flow from pipe P1B to pipe P6. However, at certain times during the pressing stage of a press-forming cycle it may be desirable to substantially or rapidly decrease the pressing force being exerted by plunger PL and, at such times, it is necessary to rapidly or substantially reduce the pressure of the pressurized fluid supplied to the upper end of cylinder CY, as is obvious. This is, of course, accomplished by the actuation of servo valve SV in accordance with the program for said pressing stage of the press-forming cycle. However, too rapid a reduction in said pressure and resultant back flow of pressurized fluid through pipes P3, P1A, P1B, and P6 may subject such pipes or conduits to undue stresses or strains or so-called "fluid hammer." This is prevented by the use of variable restriction VR which is connected in multiple with check valve CV to allow a controlled amount of pressurized fluid back flow through servo valve SV to reservoir RS. In other words check valve CV is provided to permit substantially free flow of a pressurized fluid from pipes P6 to P1B, and restriction VR is provided to limit the rate of back flow of pressurized fluid to valve SV during a period of rapid reduction in the pressure supplied to the upper end of cylinder CY. Restriction VR is manually adjustable or variable so that an optimum rate of pressurized fluid back flow can be selected in accordance with the program of pressing forces. Variable restrictions such as VR are well known in the art.

I claim:

1. In an apparatus including first and second complemental mold members for press forming an article from a charge of molten thermoplastic material, a system for controlling pressing forces exerted by said mold members in accordance with parameters relating to the forming characteristics of said molten material and the shape and dimensions of the article to be finally formed from said charge of material, such system comprising, in combination;
    A. means for providing a sequence of first signals representative of a program of pressing forces selected in accordance with said parameters,
    B. means responsive to said sequence of signals for actuating said mold members to press form said article,
    C. means for producing a sequence of second signals representative of actual forces exerted by said mold members in said press forming of said article,
    D. means for receiving and comparing corresponding ones of said first and second signals and producing error signals representative of any differences between such corresponding signals, and
    E. means responsive to said error signals for adjusting the pressing forces exerted by said mold members in said press forming of said article.

2. A control system in accordance with claim 1 and in which said molten material is a glass-making material.

3. In combination with an apparatus including a male mold member and a cooperative female mold member for press forming an article from a charge of a molten thermoplastic material supplied to the mold cavity of said female mold member, said apparatus also including means for controlling the actuation of at least one of said mold members toward the other for said forming of said article and, following such forming of the article, reversing said actuation to enable separation of the formed article from said mold members; a system for controlling the forces employed for the press forming of said article in accordance with parameters relating to the press-forming characteristics of said molten material and the shape and dimensions of the article to be finally formed from said charge of such material, said system comprising;
    A. means for providing a first sequence of signals representative of pressing forces necessary to press form said article in accordance with said parameters,
    B. means for producing a second sequence of signals representative of pressing forces actually exerted by said mold members to press form said article in accordance with said parameters, C. means for receiving and comparing corresponding signals of said sequences and producing third signals representative of any differences in such corresponding signals, and D. means responsive to said third signals for controlling the pressing forces exerted by said mold members to press form said article.

4. A control system in accordance with claim 3 and in which said molten material is a glass-making material.

5. In a press-forming apparatus including complemental mold members at least one of which is actuated toward the other by pressurized fluid for the press forming therebetween of an article from a charge of molten thermoplastic material, a system for controlling the pressing forces exerted against said charge during at least part of the actual press forming stage of the forming cycle for said charge, such system comprising, in combination;

A. means for providing a first varying signal representative of a program for said pressing forces, B. means producing a second varying signal representative of the actual pressing forces exerted against said charge during said stage of the press-forming cycle, C. means receiving and comparing said first and second signals during said stage of the press-forming cycle and producing third signals representative of any differences in the first and second signals, and D. means responsive to said third signals for controlling said pressing forces by selective adjustment of said pressurized fluid during said stage of the press-forming cycle.

6. A control system in accordance with claim 5 and in which said molten material is a glass-making material.